United States Patent [19]
Steiner et al.

[11] Patent Number: 6,161,807
[45] Date of Patent: Dec. 19, 2000

[54] PORTABLE OPTOMETRIC SUPPORT STAND

[76] Inventors: Michael Steiner, 4031 Ambaum Blvd. SW., Seattle, Wash. 98166; Nicholas Breigenzer, 12928 SE. 217th Pl., Kent, Wash. 98031

[21] Appl. No.: 08/960,992

[22] Filed: Oct. 30, 1997

Related U.S. Application Data

[63] Continuation of application No. 08/534,637, Sep. 27, 1995.

[51] Int. Cl.[7] .................................................. F16M 11/24
[52] U.S. Cl. ............................. 248/166; 248/165; 182/184
[58] Field of Search .................................. 248/166, 163.2, 248/171, 165, 167, 188.6, 188.5, 122.1, 124.1, 125.1, 125.8, 168, 439, 172, 272.14, 292.12, 125.2, 404, 293.31; 182/186, 184, 187, 181, 155

[56] References Cited

U.S. PATENT DOCUMENTS

| | | |
|---|---|---|
| 2,325,592 | 8/1943 | Degler ........................................ 182/184 |
| 2,408,247 | 9/1946 | Wekeman ................................... 248/165 |
| 2,410,330 | 10/1946 | Ashenfelter ............................... 182/184 |
| 2,919,094 | 12/1959 | Petrick ....................................... 248/171 |
| 3,091,886 | 6/1963 | Nutting .................................... 248/125.2 |
| 5,037,053 | 8/1991 | Fox et al. ................................. 248/278.1 |
| 5,102,079 | 4/1992 | Lee ............................................ 248/166 |

*Primary Examiner*—Anita M. King
*Attorney, Agent, or Firm*—David L. Tingey

[57] ABSTRACT

A portable, optically-stable stand, sized to fit over a bed or chair, such as a wheel chair, adapted to collapse with pivoting legs compactly folded parallel to a main beam, is configured to unfold with all support legs mutually diverging. On the main beam is removably attached a vertical post. Eye examination equipment is mounted height-adjustable to the vertical post with a sleeve sliding over the post, regulated with rack and gear. The main beam and legs are telescoping to enhance compactness. The legs are secured in an optically stable support position with leg proximal ends pivotably received in a slot with a slot flat end. With the pivoting legs diverging in said support position, a leg end terminating in an oblique, flat surface is leans in face-to-face contact against the slot flat end to limit further pivoting. In the primary embodiment, the legs unfold from a stored position in double-axis rotation, with first a vertical rotation of a bar in a tube attached to each end of the main beam followed by a vertical rotation of each leg, pivotably attached to the bar, in a plane generally transverse to the main beam. In an alternative embodiment, a bar is affixed transversely to each end of the main beam from which bar a leg pivotably unfolds from each end of the bar from its stored position to its support position in a single-axis rotation in a plane oblique to the main beam and bar and parallel the main beam.

4 Claims, 6 Drawing Sheets

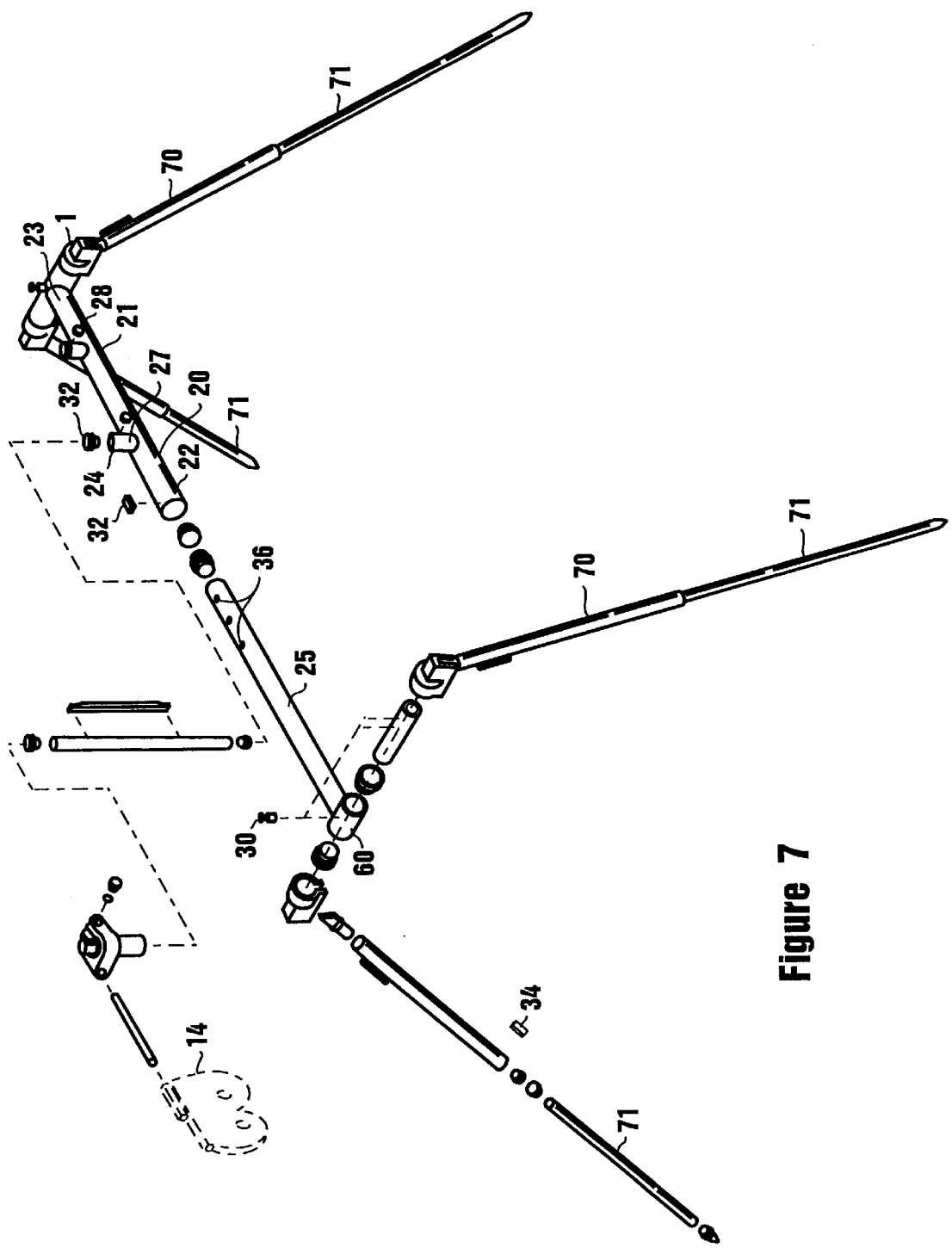

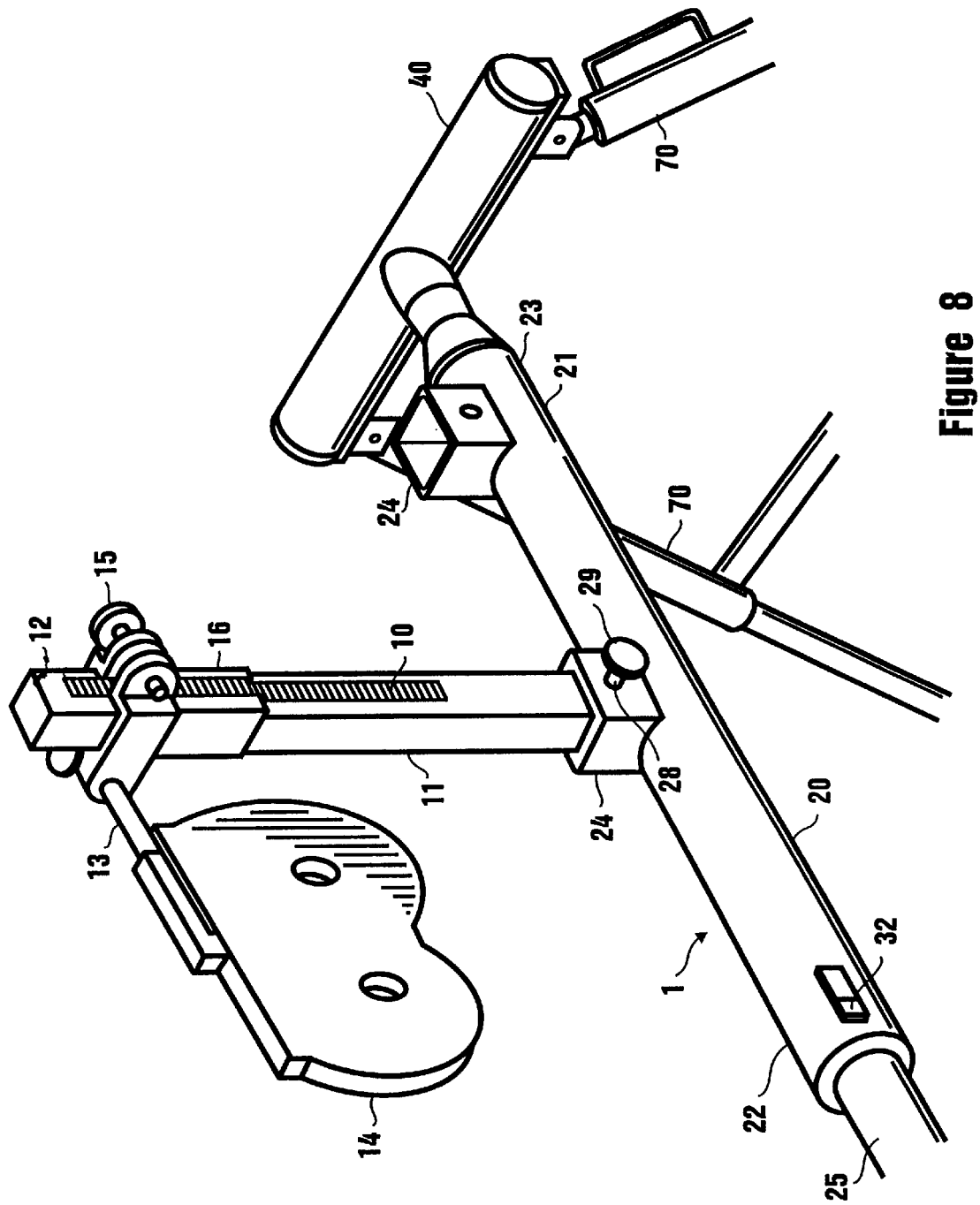

PORTABLE OPTOMETRIC SUPPORT STAND

This Application is a Continuation of Ser. No. 08/534,637 filed Sep. 27, 1995.

BACKGROUND OF THE INVENTION

The present invention relates generally to portable tables or stands and in particular to a stable, adjustable, portable platform in combination with an optometric instrument for measuring for eye glasses away from an optometrist's office.

It is presently known in the art to have a measuring apparatus mounted on the floor in an optometrist's office. Generally, the apparatus is large, heavy, and not suited to a portable application. For applications requiring measurement away from the optometrist's office, such as for immobile or invalid persons unable to go to an office or perhaps unable to move to or sit in an optometrist's measurement chair, the optometrist must transport and stabilize his optometric equipment at the site of patient. Such occasions, for example, may include a bed-ridden patient, which would then entail mounting the equipment in a stable position over the patient's bed with position adjustments to bring the equipment to the patient's eye level rather than require the patient to bring his eye level to the equipment. Suitable portability requires that the equipment and the mount for the equipment be reduced to a manageable package that may be actually carried by a person.

It is known in the art to have various equipments for measuring a person's eyes and various platforms on which the equipments can be mounted. However, it is not previously known to have such an adjustable platform that is optometrically stable with measurement equipment that is lightweight and that can be disassembled or folded, transported and conveniently reassembled at the site of the patient.

The principal object of the present invention is to provide a lightweight, stable, adjustable, portable stand with optometric instruments for measuring for eye glasses away from an optometrist's office that can be conveniently carried by a single person and thus transported to and assembled at a location of a person not able to be transported to the office of a optometrist for measurement. It is a further object that the stand provide very low deflection such that the optical inspection instrument deflects less than 0.010 inches. It is a further object that the stand can be disassembled and collapsed (folded and retracted) into a compact unit for transport or storage.

SUMMARY OF THE INVENTION

These objects are achieved in a portable optometric support stand that can be reduced to a compact carrying size of approximately 1 foot by 3 feet by 6 inches with a weight of approximately 25 pounds. Eye measurement equipment mounted to the stand such as a phoroptor weighs approximately an additional 10 pounds.

Intended for use over a chair, including wheel chair, and a bed, with the stand supported by legs on end, the stand must straddle a width of approximately 54 inches, the typical width of a single bed. Thus, the stand presents a telescoping main horizontal beam adjustable in length from about 3 feet without telescoping to the bed width when fully telescoping. An eye examination mount assembly is removably attached intermediate the horizontal beam such that the post and eye examination equipment can be positioned in a selected receptacle for convenience in locating the examination equipment along the extent of the horizontal beam.

A standard eye height for a patient seated in a standard chair or wheelchair is approximately 50 inches. A standard eye height for a patient seated in a standard bed is approximately 52 inches. So that the stand can remain stable without leg adjustment, the examination equipment is height-adjustable with a range of approximately 8 inches. This is achieved in a vertical post in the eye examination mount assembly on which is mounted a height-adjustable sleeve. To accommodate minor variations in conditions, the sleeve adjustment is provided with a range of the inspection equipment on the stand from 46 inches to 54 inches. With height adjustment provided with a single movement of the adjustable sleeve, cumbersome adjustment of each support leg is avoided.

A leg mount assembly is provided on each beam end to which is attached a mutually diverging pair of support legs. To be optically stable sufficient for optometric use, assuming an abuse load of 15 pounds instead of the phoroptor weight of 10 pounds, at a typical height of 54 inches for a person sitting in bed or in a chair, in according with standard stability analysis, leg ends should be 49 inches apart. Increasing the stance 10% as a safety margin to 54 inches, the separation of a pair of legs on a horizontal beam end is required to be 54 inches.

The horizontal beam to fit over a bed and wheel chair must be maintained on its legs at a height of approximately 40 inches. The diverging legs therefore are of approximately of length 48 inches. Because this length exceeds the length criteria of the stand for portability of 36 inches, the support legs are extendable from 36 inches to approximately 48 inches through telescoping members held in extended or collapsed position by a set pin and matching holes on the leg length.

In the preferred embodiment FIG. 5, each leg pivots in the leg mount assembly on a single axis from its storage position in parallel with the main horizontal beam to its support position with legs of a pair on a beam end mutually diverging. In an alternative embodiment, the leg mount assembly comprises two axes of rotation for the legs, one downward from the main beam in a vertical plane with the legs remaining in parallel and then outward in a plane in which the legs diverge. In both cases, for increased stability, pairs of legs in their support position on each main beam end, in addition to mutually diverging within a pair, also mutually diverge.

In both embodiments, the leg at its end proximal attaching to the beam pivots on a pivot pin near the end and terminates in a slanting plane crossing the leg. To establish a stable pivoting limit guaranteeing that the leg will not move in its support position, the slanting leg end leans against a matching surface of the leg mount assembly. With the weight of the stand and measurement equipment urging the leg distal ends outward on the pivot pin, the slanting end is further urged against the leg mount assembly. Thus, as otherwise destabilizing load increases, stability of the stand increases. Stability is further enhanced by all stand support legs mutually diverging, in effect presenting mutually opposing horizontal forces.

The portable optometric stand should have a total deflection of no more than 0.010 inch to limit movement of the eye measurement equipment, such as phoroptor, mounted thereon. Constructing the outer member of the telescoping beam of round 2.75-inch outer diameter aluminum tube and the inner member of round 2.25-inch outer diameter, tube both with a ⅛-inch wall, yields a calculated maximum vertical deflection of 0.0034 inch to the horizontal beam by standard deflection analysis. Constructing the vertical post of 2-inch round aluminum tube with ⅛-inch wall yields a maximum vertical deflection of less than 0.005 inches for a phoroptor mounted 8 inches from the post on a horizontal bar 16 inches from the horizontal beam. Thus, these materials from which the stand is constructed yield a total maximum deflection less than the sum of the separate deflections, or less than 0.010 inches in accordance with the optometric requirement and also within the weight requirement of the total stand.

BRIEF DESCRIPTION OF THE DRAWINGS

FIG. 7 is an exploded view of the stand.

FIG. 8 is a perspective view of the vertical post, sleeve, and eye measurement equipment, with rack and pinion.

DESCRIPTION OF THE PREFERRED EMBODIMENTS

Figure 1:
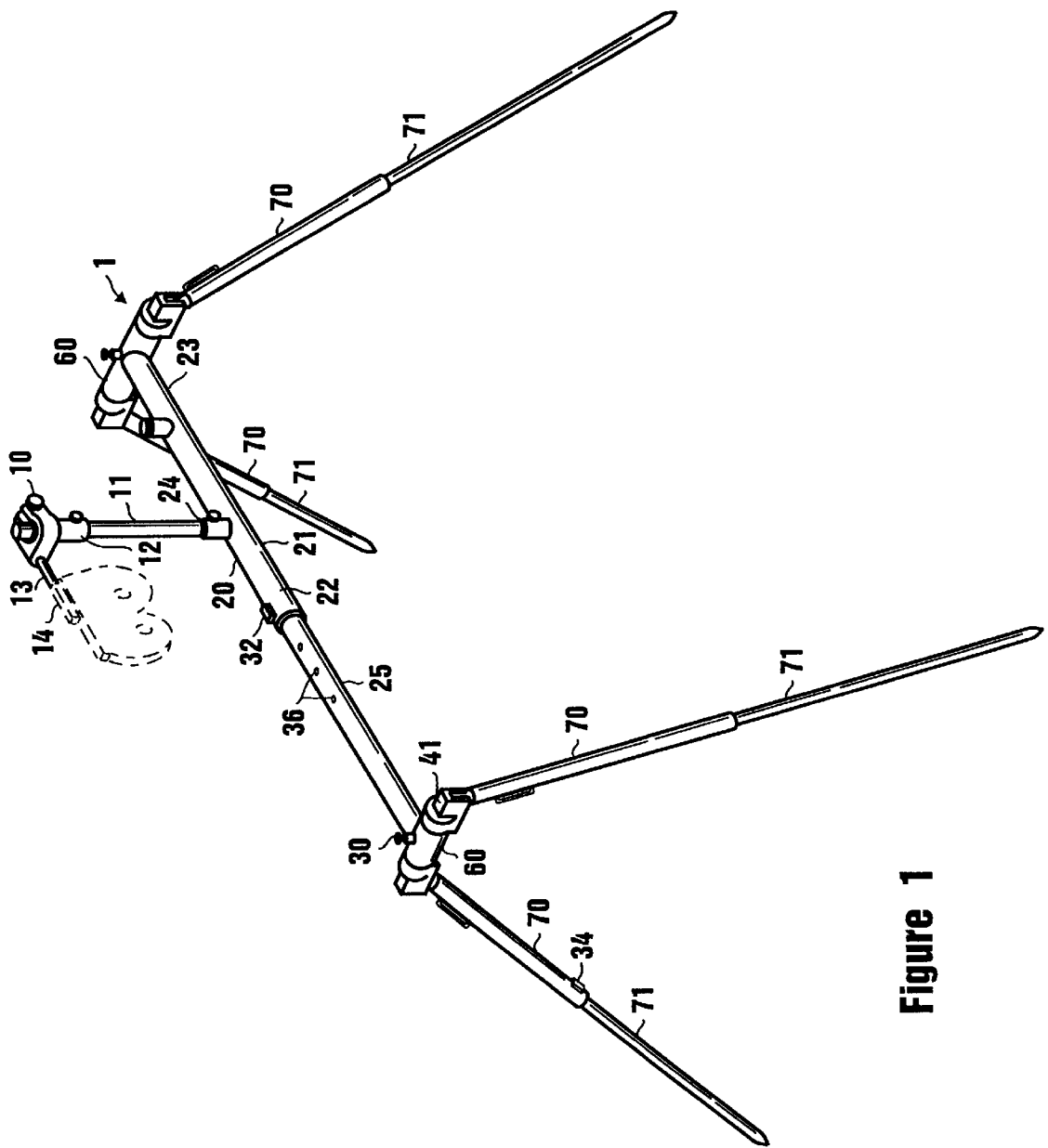
FIG. 1 is a pictorial view of the stand erected in support position with eye examination equipment.
Figure 2:
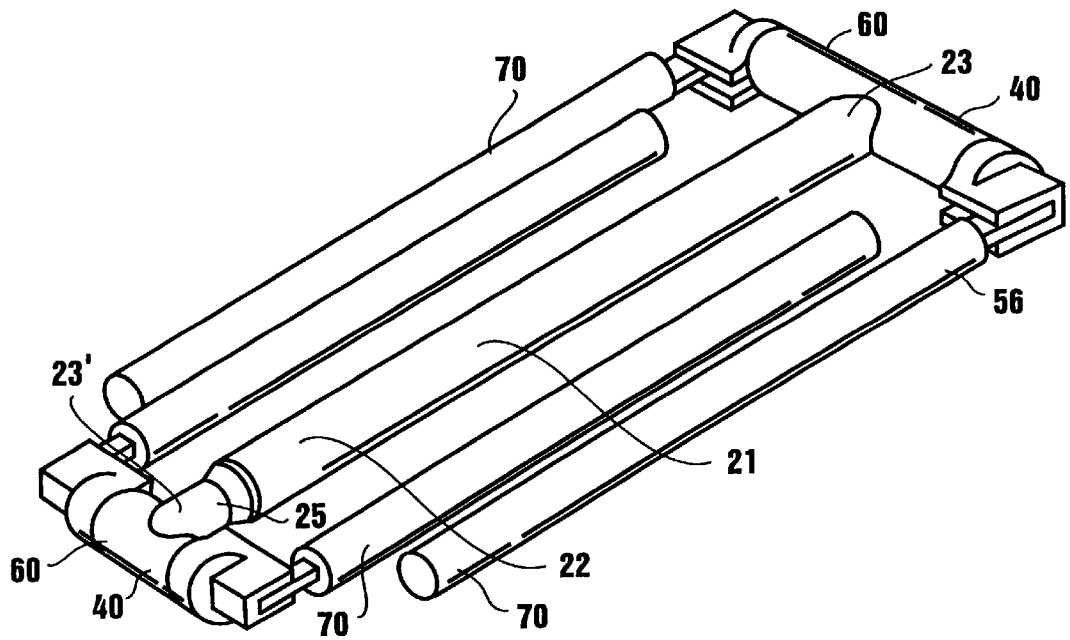
FIG. 2 is a pictorial view of the stand in folded position.
Figure 3:
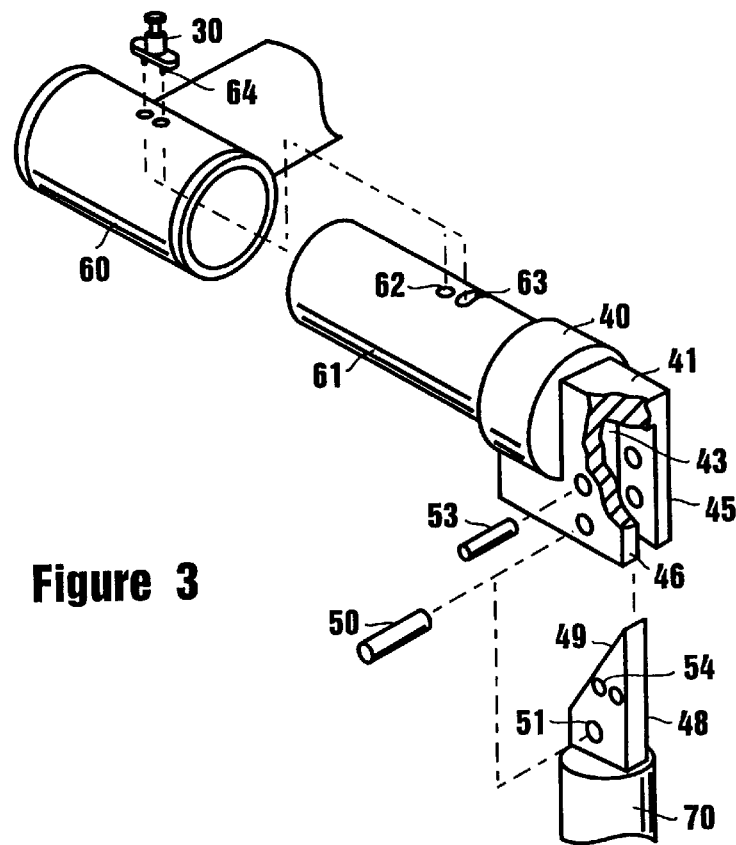
FIG. 3 is an exploded view of the rotatable leg mount assembly with a cut-away showing a flat slot end.
Figure 4:
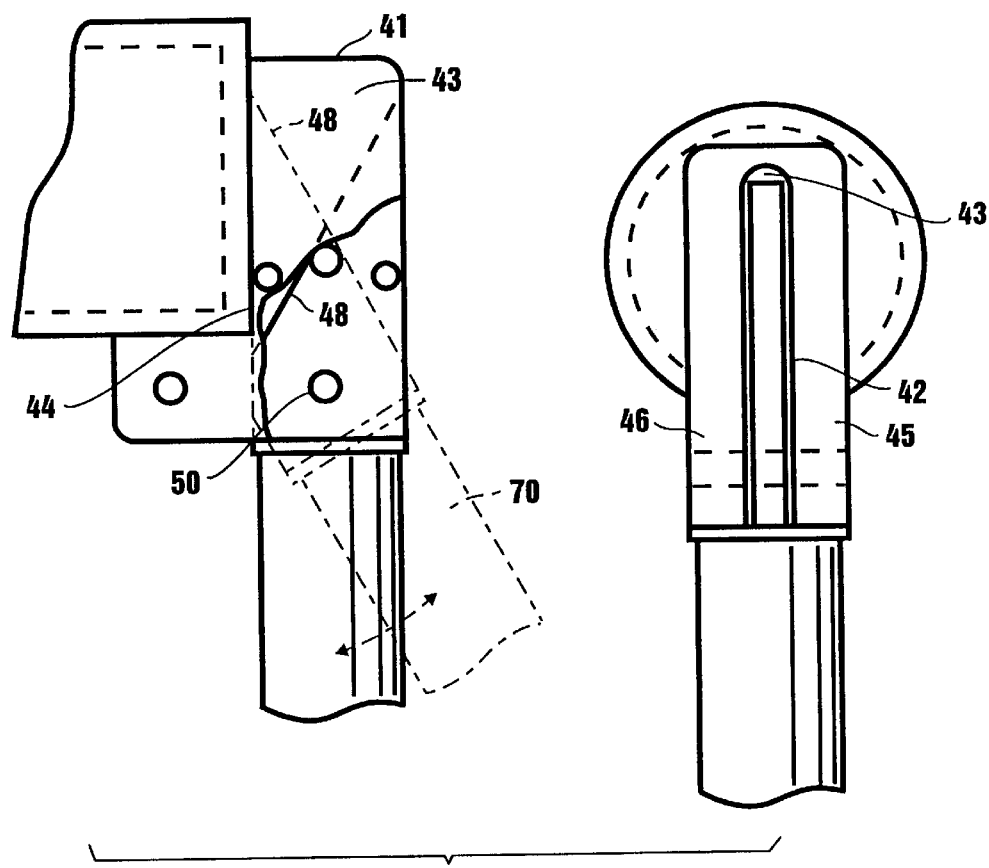
FIG. 4 are side and end views of the primary embodiment double-axis leg mount.
Figure 5:
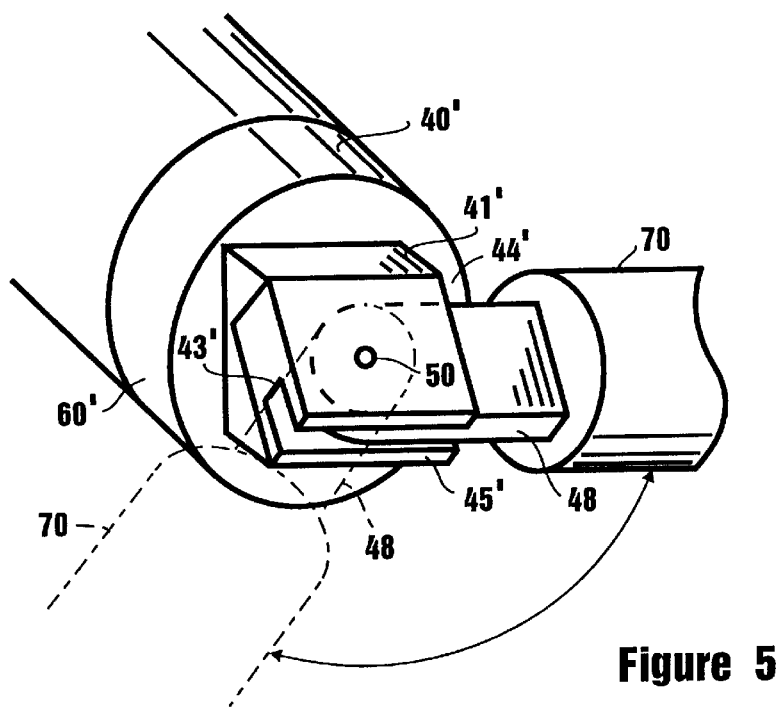
FIG. 5 is a pictorial view of an alternative embodiment comprising a single-axis leg mount
Figure 6:
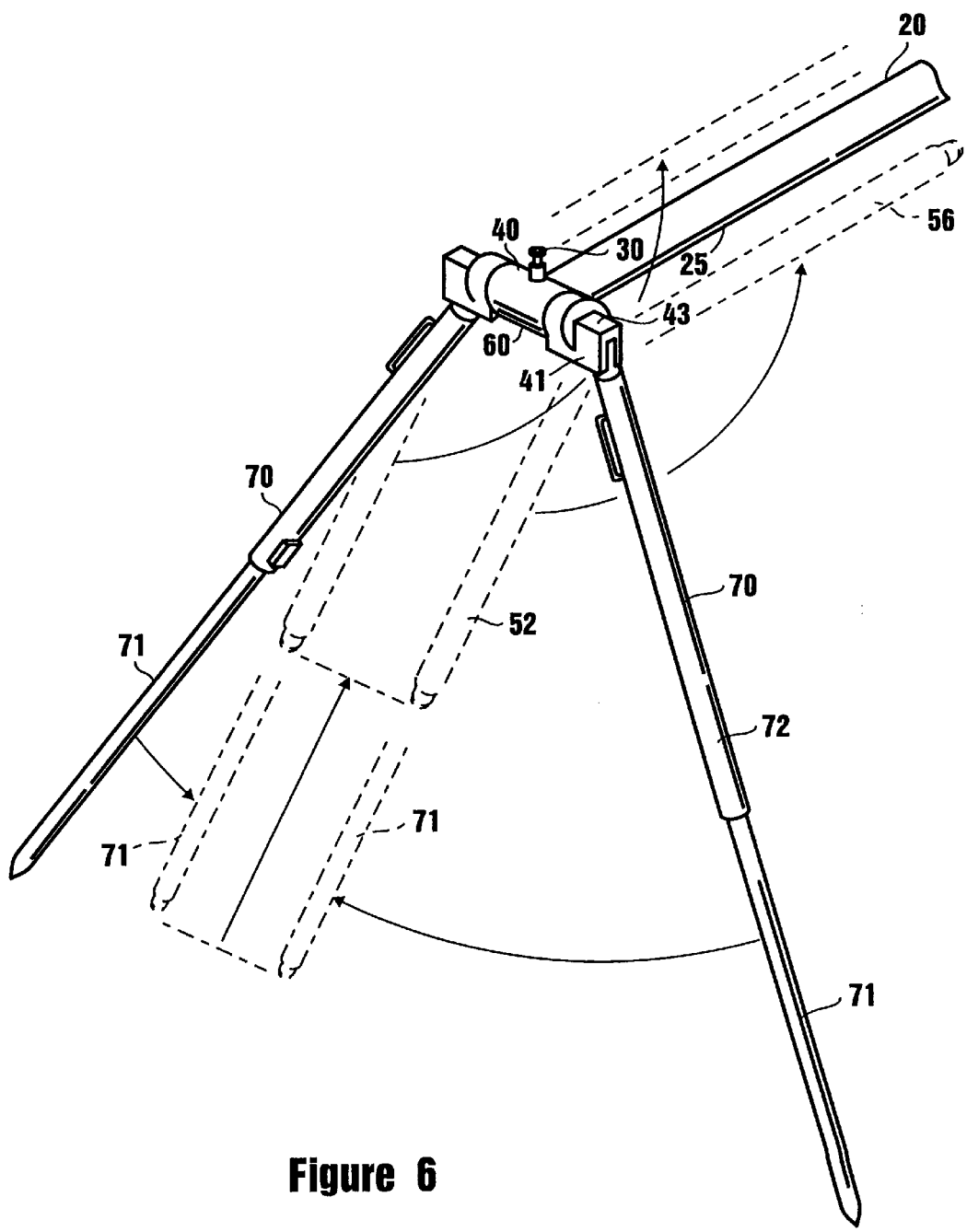
FIG. 6 is a pictorial view of the leg rotation of the double-axis leg mount assembly of the preferred embodiment.

Referring to the figures, the present invention describes an portable stand 1 comprising eye examination mounting assembly 10 for eye examination, a telescoping horizontal main beam 20, spring-loaded pins 30, 32 and 34, leg mount assembly 40, and support legs 70.

Eye examination mounting assembly 10 is provided which comprises a round, tall post 11 constructed of 2-inch round aluminum tubing, ⅛-wall. The mounting assembly further comprises a height-adjustable sleeve 12 slidably mounted over the vertical post 11, a horizontal bar 13 secured to the adjustable sleeve 12, and eye-measurement and inspection equipment 14 attached to the horizontal bar 13. A pinion 15 is included on the vertical sleeve 12 and a rack 16 is provided on the vertical post 11 into which meshes the pinion 15 to provide a regulated adjustment of the sleeve 12 on the bar 13.

The vertical post 11 is removably secured in selective support receptacle 24 by a quick-release clamp 26 which may comprise a threaded hole 27 in the receptacle 24 through which is screwed a matching bolt 28 with a large knob 29 for ease of hand tightening, the bolt 28 tightened against the vertical post 11 in the receptacle 24 for securing the examination mounting assembly and loosened to remove the vertical post 11.

The telescoping horizontal main beam 20 includes an outerbeam 21 with first and second ends 22 and 23 and a plurality of support receptacles 24 intermediate its length sized for removably receiving vertical post 11. The main beam further includes an inner beam 25 telescoping from the outer beam 21 slidably extendable from the outer beam first end 22, and a plurality of holes 36 longitudinal on the inner beam 25. Main spring-loaded pin 32 is located on the outer beam 21 removably extending into a selected hole 36 on the inner beam 25, locking the inner beam 25 into position within the outer beam 21.

The leg mount assembly 40 comprises leg pivot housing 41 with a slot 42 which includes a slot end 43 and inner slot side 44 separating a slot top 45 and bottom 46. The leg attachment end 48, sized to slideably fit in the housing slot 42, terminates in a slanted leg end flat surface 49 crossing the leg end 48 parallel to pivot pin 50. Said pivot pin 50 between the slot top 45 and bottom 46 passes through a matching hole 51 in the leg 70 near its attachment end 48 such that the leg swings freely in the slot from the pivot pin 50 with the leg slanted plane 49 rotating into face to face contact with the slot end 43 when the leg 70 is swung out from its stored position 56 parallel to the main horizontal beam 20 to its support position 52 fully rotated downward to support the horizontal main beam 20. The legs are locked in their support position 52 by a set pin 53 in the leg mount assembly 40 in combination with a detent 54 in the leg with the legs mutually diverging from the leg mount assembly 40 and limited in rotation by the contact of the leg slanting plane 49 on the housing slot end 43.

The legs are mounted in the leg mount assembly with two axes of rotation of the legs 70 from their stored position 56 to their support position 52. A leg mount assembly 40 on each horizontal main beam end 23, 23' comprises a tube 60 secured central to its length and transverse to the main beam 20. Passing rotatably through the tube 60 is a cylindrical bar 61 with a first set pin hole 62 located to secure the bar 61 with the legs in support position 52. A similar second set pin hole secures the bar with the legs in stored position 56. The tube 60 also has a circumferential slot 63. A guide pin 64 extends radially from the bar 61 into the circumferential slot 63 to limit rotation of the bar 61 in the tube 60 between the leg stored and support positions. Affixed to each end of the cylindrical bar 61 and spaced apart a distance greater than the width of the horizontal beam 20 is the leg pivot housing 41. To fold the legs against the horizontal beam for transporting, the legs are brought together in parallel with each other in the leg mount bracket and then, when the set pin is withdrawn, raised in unison to a position parallel with the main beam with a leg on each side with the cross-section of the folded stand being less than 5 inches in height and 1 foot in width.

In an alternative embodiment, the legs unfold in a single-axis pivot from their stored position to their support position. A leg mount assembly 40' comprises a horizontal bar 60' attached orthogonal to the main beam to which is affixed a leg pivot housing 41' on each bar end. The alternative leg pivot housing 41' comprises a leg mount assembly slot 45' parallel to a plane oblique to that horizontal plane defined by the main beam 20 and the horizontal bar 60' and parallel to the main beam 20 in which horizontal plane the legs lie while in their stored position. Each leg 70 is pivotably mounted in the leg mount assembly slot 42 such that the leg 70 pivots on a single axis and on only in said oblique plane from its stored position 56 parallel with the main horizontal beam 20 to its support position 52. So that the all 4 stand legs 70 mutually diverge, the legs rotate in their respective assembly slot 42 greater than 90 degrees. With a leg 70 in stored position, the leg rests against the slot side 44'. With the leg 70 in its support position 52, the leg rests against the slot end 43'. So that the leg 70 can pivot in the slot 42 more than 90 degrees, in this alternative embodiment the leg attachment end 48' is rounded instead of terminating in a slanted leg end surface 49 of the preferred embodiment, and the slot end 43 is partially open such that the slot extends into the slot end 43 allowing the leg to rotate past the slot end.

Legs 70 are telescoping and comprise an outer member 72 connected to the leg pivot housing 41 and an inner member 71 slidably extending from the outer member 72. The members are held in selective positions by leg set pins in a plurality of holes intermediate the legs 70. A spring biased leg set pin on the outer member removably releases into a corresponding leg set pin hole securing the inner member in an extended position. On the leg distal end of each inner leg member is a ball caster for easy movement of the stand 1 over carpet or hard flooring.

One skilled in the art will recognize the advantages taught by this invention and illustrated by the preferred embodiment presented. The specification and drawings are not intended to represent an exhaustive description of the invention. Obvious applications and extensions of the invention are intended to be within the spirit and scope of this invention.

What is claimed is:

1. A portable optometric stand comprising a pivot pin, a horizontal main beam terminating in first and second ends, a plurality of legs having distal and proximal ends comprising a first pair of legs mounted on the horizontal main beam first end and a second pair of legs mounted on the horizontal main beam second end, each of said first and second pair of legs rotatable from a stored position parallel to said main beam to a support position downward from said main beam with said legs of each pair mutually diverging, each of said plurality of legs rotating between said stored position and said support position in a plane oblique to a horizontal plane in which the legs lie while in their stored position in a single rotation movement, at least one leg of said pairs of legs having a pivot hole near said leg proximal end through which the pivot pin passes, each said proximal end of said at least one leg terminating in a flat surface in a plane parallel to said pivot pin, a leg mount housing for each said at least one leg having a slot into which said leg proximal end is received, said slot including a flat slot end, wherein said pivot pin orthogonally crosses the slot parallel to the flat slot end, and wherein said at least one leg disposed in said slot such that said at least one leg pivots on the pivot pin outward from the main beam until said flat surface rests in face-to-face contact against the flat slot end thereby preventing further movement of the leg outward from the main beam.

2. A portable optometric stand comprising an eye examination mount assembly for receiving eye examination apparatus, a horizontal main beam terminating in first and second ends, a pivot pin, a plurality of legs having distal and proximal ends comprising a first pair of legs mounted on the horizontal main beam first end and a second pair of legs mounted on the horizontal main beam second end, each of said first and second pair of legs rotatable from a stored position parallel to said main beam to a support position downward from said main beam, at least one leg of said pairs of legs having a pivot hole near said leg proximal end through which the pivot pin passes, each said proximal end of said at least one leg terminating in a flat surface in a plane parallel to said pivot pin, a leg mount housing for each said at least one leg having a slot into which said leg proximal end is received, said slot including a flat slot end, wherein said pivot pin orthogonally crosses the slot parallel to the flat slot end, and wherein said at least one leg disposed in said slot such that said at least one leg pivots on the pivot pin outward from the main beam until said flat surface rests in face-to-face contact against the flat slot end thereby preventing further movement of the leg outward from the main beam, therein defining said support position with said pairs of legs extending downward from said beam and with said legs of each pair mutually diverging, one or more support receptacles intermediate the horizontal main beam for removably receiving a vertical post, a removable vertical post secured firmly in the support receptacle, the post of length suitable for slidably mounting thereon a height-adjustable sleeve, an adjustable sleeve slidably mounted over the vertical post with means to secure the sleeve at a selectable height, a horizontal bar secured to the adjustable sleeve for receiving eye examination equipment, in which the means to secure the sleeve at a selectable height comprises a pinion on the sleeve, and a rack on the vertical post into which meshes the pinion to provide a regulated adjustment of the sleeve on the bar.

3. The optometric stand of claim 2 in combination with a phoroptor mounted on the horizontal bar as the eye examination equipment.

4. A portable optometric stand comprising an eye examination mount assembly for receiving eye examination apparatus, a horizontal main beam terminating in first and second ends, a plurality of leg mount housings on the horizontal main beam each adapted to receive a leg, a plurality of legs comprising a first pair of legs mounted on the horizontal main beam first end and a second pair of legs mounted on the horizontal main beam second end in said leg mount housings, respectively, each of said first and second pair of legs rotatable from a stored position parallel to said main beam to a support position downward from said main beam, means for removably securing the eye examination mount assembly to the horizontal main beam, a tube affixed transversely to an end of the main beam having a circumferential slot, a cylindrical bar passing rotatably through the tube, and a guide pin extending radially from the cylindrical bar into the circumferential slot to limit rotation of the bar in the tube, the slot limited in arc between the stored position and the support position.

* * * * *